United States Patent

Harris et al.

[11] Patent Number: 6,079,444
[45] Date of Patent: Jun. 27, 2000

[54] VALVE SYSTEM

[75] Inventors: Clark Eugene Harris, Fairport; Jeffrey Charles Robertson, Rochester, both of N.Y.

[73] Assignee: Eastman Kodak Company, Rochester, N.Y.

[21] Appl. No.: 09/162,022

[22] Filed: Sep. 28, 1998

Related U.S. Application Data

[62] Division of application No. 08/808,725, Feb. 28, 1997.

[51] Int. Cl.⁷ ............................ E03B 65/20; E03C 65/20; F17D 65/20
[52] U.S. Cl. ............................... 137/614.03; 137/614.04; 141/346; 141/349; 141/351; 141/352; 141/383; 251/149; 251/149.2
[58] Field of Search ..................... 141/346, 349, 141/351–354, 383, 384, 382, 386; 134/614.03, 614.04; 251/149, 149.2; 222/81, 105, 494

[56] References Cited

U.S. PATENT DOCUMENTS

| | | | |
|---|---|---|---|
| 3,851,852 | 12/1974 | Blanchard et al. | 137/614.04 |
| 3,938,564 | 2/1976 | Jones | 141/346 |
| 4,958,666 | 9/1990 | Kocourek et al. | 141/114 |
| 5,634,505 | 6/1997 | Wong | 141/346 |
| 5,694,991 | 12/1997 | Harris et al. | 141/351 |

*Primary Examiner*—Henry J. Recla
*Assistant Examiner*—Timothy L. Maust
*Attorney, Agent, or Firm*—Gordon M. Stewart; Frank Pincelli; David A. Novais

[57] ABSTRACT

A probe comprising of a probe body, a probe post positioned in the probe body and having a forward end with a forwardly tapering front face and a rearwardly tapering probe post seat. A probe seal is provided within the probe body having a forward end with a rearwardly tapering probe seal opening forward end of the probe seal has a seal face. The forward end is movable rearwardly from a closed position sealingly mating against the probe post seat to close the probe seal opening to an open position in which the probe seal face is spaced from the probe post seat to allow fluid to pass through the probe seal opening and hence through the probe. A first resilient means for urging the forward end of the probe seal into the closed position.

4 Claims, 5 Drawing Sheets

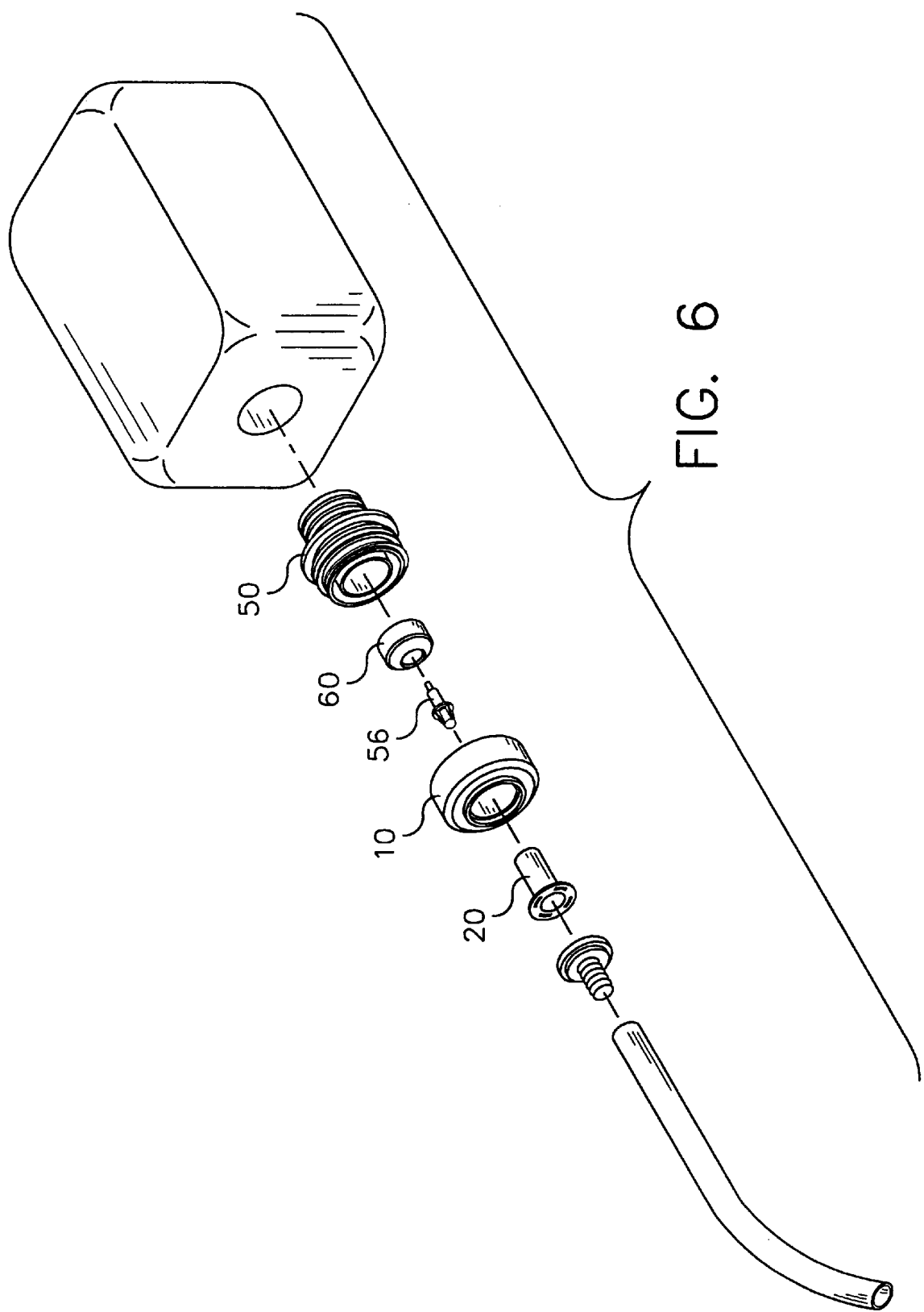

6,079,444

VALVE SYSTEM

This is a divisional of application Ser. No. 08,808,725, filed Feb. 28 1997.

FIELD OF THE INVENTION

This invention relates to an apparatus and method useful for transferring liquids from one location to another, particularly liquids which should not be exposed to an outside environment.

BACKGROUND OF THE INVENTION

In many fields it is necessary to transfer fluids from one system to another, while minimizing the loss of these fluids, for example, the transfer of fuel from a dispensing pump to a vehicle fuel tank, or the transfer of silver halide photographic processing chemicals from shipping containers to a photographic processing machine. Transfer methods range from that of simply pouring a liquid from one open container into another open container, to those involving the interconnection of the two systems by means of a closed conduit.

Even in situations wherein the transfer of fluids takes place through a closed conduit, some loss of fluid may occur when the conduit is connected and/or disconnected to allow the movement of one of the fluid systems, or to allow the exchange of a depleted chemical supply package, for a full one. Such loss of fluid may be dangerous, if the fluid is flammable, toxic, corrosive, or caustic, or at least undesirable, for instance, if the fluid is odorous, or would stain or otherwise cause damage. Many fluid coupling valve arrangements have been previously described for various environments. However, many of these allow at least some of the fluid to be exposed to the outside environment and/or have complex parts, or provide only limited fluid flow rates due to design limitations.

It would be desirable therefore, to provide means to connect two fluid systems, wherein such means would allow quick and easy connection or disconnection of the two systems. It would be further desirable if such could allow transfer of fluids from one system to the other without any loss of these fluids, wherein such means would prevent the loss of any of the fluid contained within either system, upon disconnection of the systems. It would be further desirable to provide means for the connection of two fluid systems, wherein such means provides minimal obstruction to the flow of fluids from one system to the other, wherein such means is of relatively simple construction, and wherein the components can be economically and easily manufactured and assembled.

SUMMARY OF THE INVENTION

In one aspect of the present invention there is provided a probe comprising; a probe body; a probe post positioned in the probe body and having a forward end with a forwardly tapering front face and a rearwardly tapering probe post seat; a probe seal within the probe body, the probe seal having a forward end with a rearwardly tapering probe seal opening, the forward end of the probe seal having a seal face, the forward end being movable rearwardly from a closed position sealingly mating against the probe post seat to close the probe seal opening to an open position in which the probe seal face is spaced from the probe post seat to allow fluid to pass through the probe seal opening and hence through the probe; and a first resilient means for urging the forward end of the probe seal into the closed position.

A valve and probe assemblage of the present invention can be used to transfer liquid from one location to another and can provide little or no exposure of the liquid to the outside environment. Furthermore, the valve and probe lend themselves to relatively simply construction, which optionally can avoid metal springs and the like, making for simple manufacture and ease of recycling components. Both the valve and the probe can provide a relatively large cross-section of fluid flow axially through the valve and probe with relatively low flow resistance, even with a relatively short motion in both.

BRIEF DESCRIPTION OF THE DRAWINGS

FIG. 6 is a view similar to FIG. 5 but showing valve and probe components in an exploded view.

To facilitate understanding, identical reference numerals have been used, where possible, to designate identical elements that are common to the figures.

EMBODIMENTS OF THE INVENTION

Figure 1:
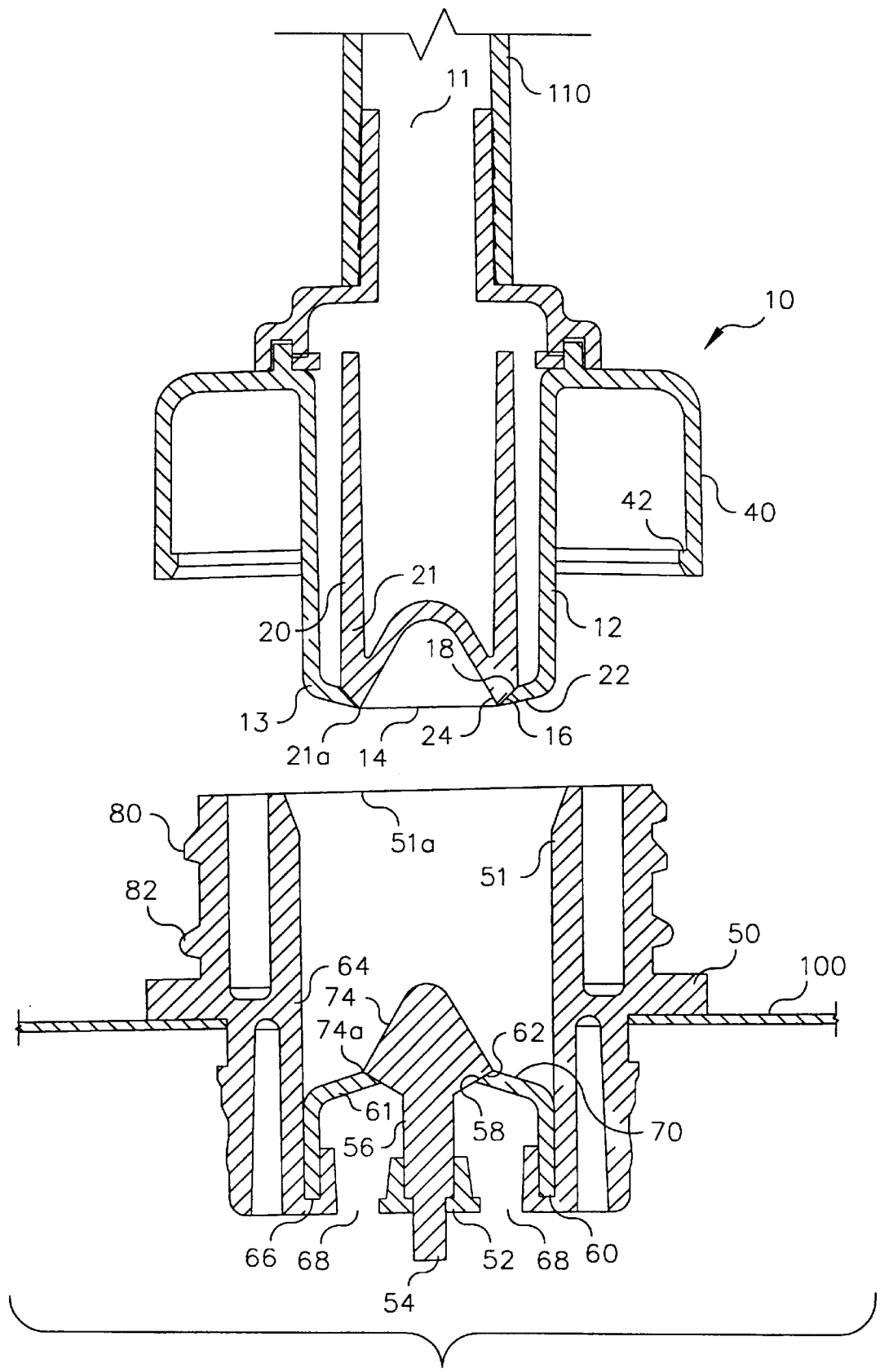
FIG. 1 is a cross-section of a valve and probe assemblage of the present invention, showing the valve and probe in the disengaged position.

Referring first to FIGS. 1 to 4, the valve assemblage shown comprises a valve 10 and a probe 50. Valve 10 is shown in communication with a liquid conveying hose 110 while probe 50 is shown in communication with a liquid carrying container 100, although this arrangement could be reversed (that is, valve 10 could communicate with container 100 and probe 50 communicate with hose 110). Valve 10 comprises a rigid valve body 12, with a rear opening 11 and a forward end 13 with a valve body opening referenced as a valve port 14. Valve port 14 is defined by an annular valve seat 18 in the forward end 13, and port 14 tapers forwardly toward a front surface of forward end 13 (the front surface being referenced as a valve face 16). A valve seal 20 is positioned in valve body 12, and has a forward end 21 with a forwardly tapering annular valve seating portion 22, which surrounds a rearwardly tapering recess 24. Valve seal 20 is made of a resilient deformable material, and by virtue of this its forward end 13 (and in particular, valve seating portion 22) is moveable rearwardly from a closed position shown most clearly in FIG. 1, to an open position shown most clearly in FIG. 3. When forward end 13 is in the closed position of FIG. 1 (corresponding to a closed position of valve seal 20 and valve 10), seating portion 22 sealingly mates against valve seat 18 to close port 14 so that fluid cannot pass through the valve between rear opening 11 and valve port 14. Further, seating portion 22 is dimensioned and sloped to fit completely against all of valve seat 18 when valve seal 20 is in the closed position, with seating portion 22 being slightly compressed laterally inward, and margin 21a protruding slightly forward of valve face 16. A second resilient means, in the form of the resiliency of the material from which valve seal 20 is made, urges forward end 21 into the closed position so that fluid cannot pass through valve 10. However, the urging means could take another form, such as a mechanical spring although this is less preferred.

A probe 50 comprises a probe body in the form of a sleeve 64 made of a rigid material and having a front opening 51a. A probe post 56 is positioned in sleeve 64, and is supported by a probe base 52 which upstandingly supports probe post stem 56 of probe post 56. Probe base 52 extends inward from sleeve 64 and has a plurality of probe passages 68 therethrough. Probe post 56 has a forward end with a forwardly tapering probe post face 74, and a rearwardly tapering probe post seat 58. The largest lateral extent of the forward end of probe 56 is defined by an annular margin 74a between probe post face 74 and probe post seat 58. A probe seal 60, made of a resilient material, is also positioned within probe body 51. Probe seal 60 has a forward end 61 having a front surface defining a probe seal face 70, and having a tapered annular seating portion 62 which defines a rearwardly tapering probe seal opening which acts as a probe port 63. Note that seating portion 62 has the same dimensions and slope as a forwardmost portion of probe post seat 58. Probe seal 60 includes a probe seal skirt 66 which may be tightly fitted within probe sleeve 64, to prevent fluid flow therebetween, or alternatively, probe seal skirt 66 may be bonded to probe base 52. Due to the resilient nature of the material from which probe seal 60 is made, the forward end 61 is rearwardly moveable from a closed position sealingly mating against probe post seat 58, to an open position in which forward end 61 is rearwardly spaced from probe post seat 58 to allow fluid to pass through probe port 63 and hence through probe 50. The resilient nature of the material also acts as a first means for urging the forward end 61 into the closed position so that fluid cannot pass through probe 50. However, the urging means could take another form, such as a mechanical spring although again this is less preferred.

As can be seen from the drawings, valve body 12 is dimensioned to slidingly engage through front opening 51a of probe 50 and into sleeve 64. Further, the lateral dimensions of a forward margin of valve port 14 at valve face 16, margin 21a of valve seal 20, a forward margin 63a of probe port 63 (that is, the dimensions of probe port 63 at probe seal face 70), and the probe at margin 74a, are all substantially the same. Such dimensioning enables valve face 16 and probe seal face 70 to sealingly mate against each other before valve 10 and probe 50 are moved into their open positions. By "substantially" the same in the foregoing context and elsewhere in this application where sizes are described as being substantially the same, is referenced the fact that those component sizes are sufficiently similar as to allow the valve and probe to function as described although the dimensions may not be exactly the same. For example, the lateral dimension of margin 21a must be slightly smaller than the margin 74a of probe 56, for the probe 56 to be able to pass through port 14 and open valve seal 20. However, such different dimensions are within the meaning of the term "substantially" the same.

Resilient materials used for valve seal 20 and probe seal 60 may particularly be injection moldable thermoplastic elastomers such as SANTOPRENE (made by Advanced Elastomer Systems, Cantonment, Fla., USA) or thermosetting elastomers such as silicone rubbers. Rigid parts of both valve 10 and probe 50, can be made from plastics such as polethylene or polyethylene (which are relatively chemically inert in silver halide photographic chemicals). Rigid parts can also be made of polystyrenes, acrylonitrile butadiene styrenes ("ABS"), acetals (such as DELRIN made by DuPont, USA and CELCON made by Hoechst Celanese USA) which may be acceptable in certain chemical (particularly non-photographic chemical) environments. Hard parts also could be metallic but plastic is preferred for ease of manufacture and recycling ability. When a resilient material such as the foregoing elastomers are used, the material should be selected with thickness, Durometer reading, and length, to allow some negative internal pressure without causing valve seal 20 or probe seal 60 to open since some liquid transfer operations (such as siphoning) will result in such negative pressure, and it is undesirable that this negative pressure alone cause valve seal 20 or probe seal 60 to open.

Figure 2:
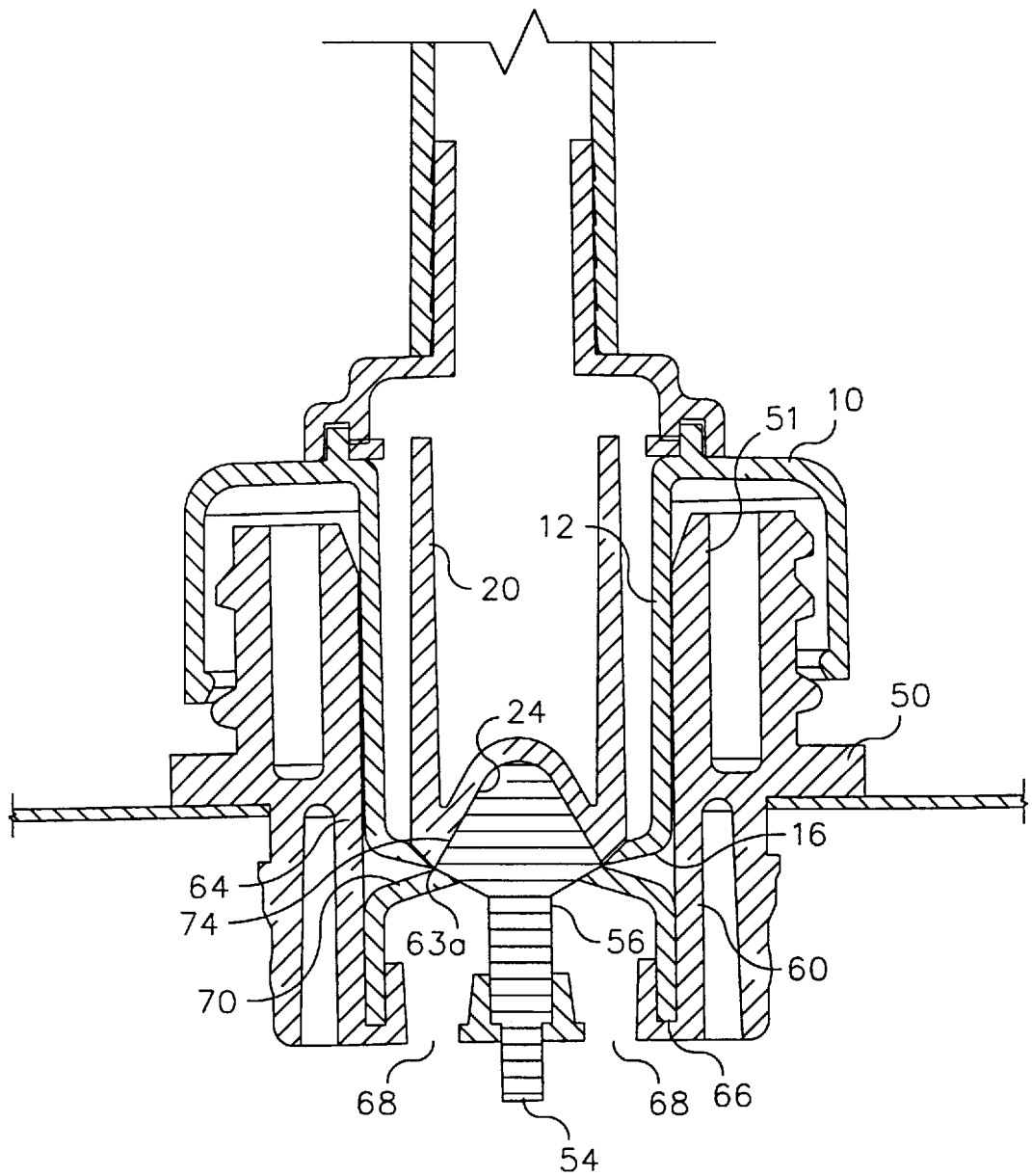
FIG. 2 is a view similar to FIG. 1 showing the valve and probe in the intermediate position.
Figure 3:
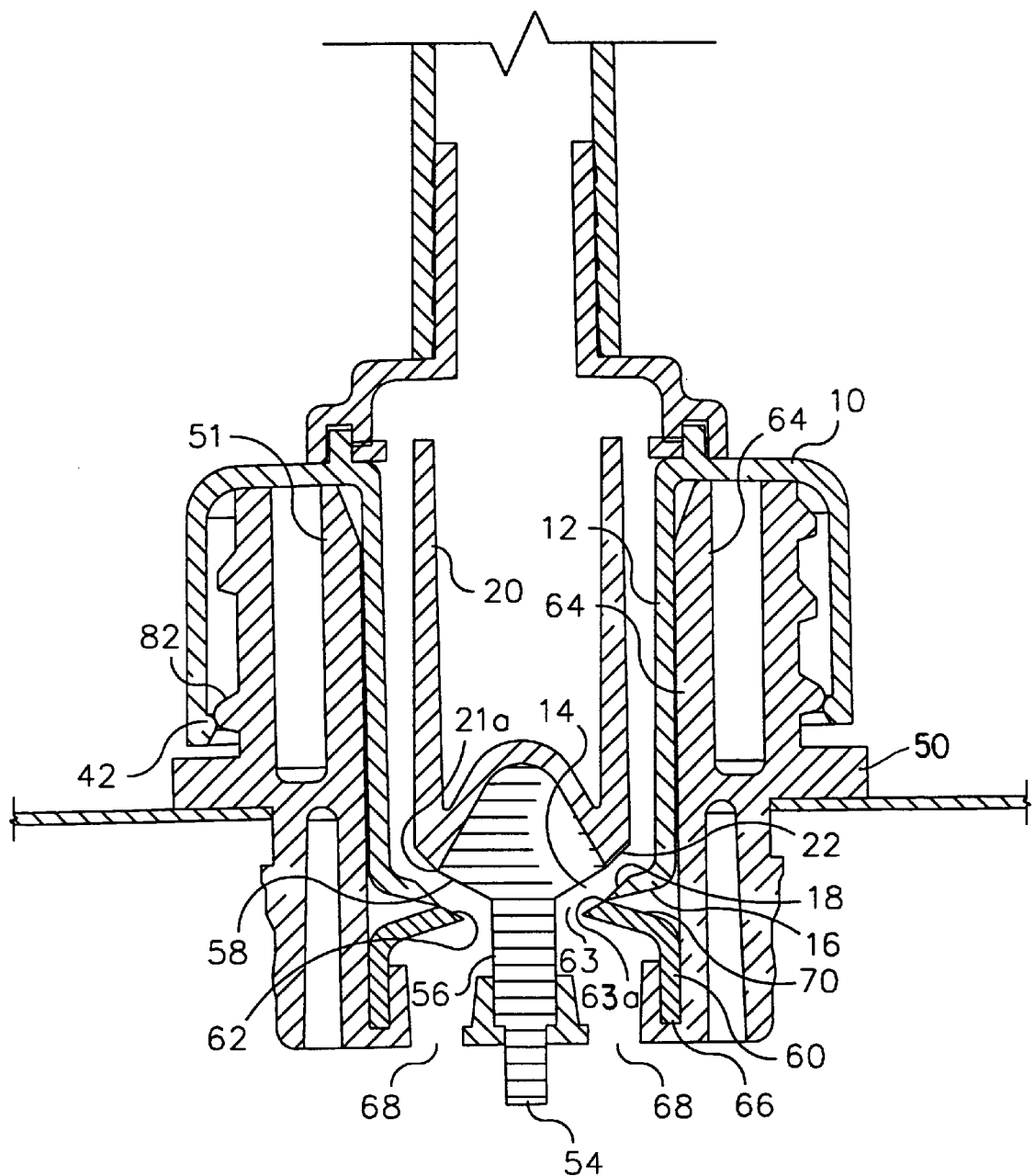
FIG. 3 is a view similar to FIG. 1 showing the valve and probe in the engaged, or mated, position.

Probe 50 and valve 10 can be moved from a disengaged position to their engaged position as illustrated proceeding from FIG. 1 to 3. One of probe 50 and valve 10 can be moved in its forward direction toward the other one (this includes the possibility of both being moved in their respective forward directions toward one another). As a result of probe sleeve 64 extending forward of probe post 56 and probe seal 60, sleeve 64 acts as a guide to align valve 10 and probe 50. In particular, front opening 51a, being rearwardly tapering, guides forward end 13 of valve body 12 into sleeve 64 and toward forward end 61 of probe seal 60. Valve face 16 will then contact probe seal face 70, forming a seal therebetween which will prevent lateral movement of fluid between forward end 61 of probe seal 60, and forward end 13 of valve body 12. Also, valve seal recess 24, formed to the same shape as probe post face 74, contacts probe post face 74, forming a seal therebetween. This position is an intermediate position as shown in FIG. 2. Note that in this intermediate position, due to the tapering shapes of recess 24 and matching probe post face 74, and the resilient nature of valve seal 20, probe post face 74 as it pushes into recess 24 laterally urges seating portion 22 outward against valve seat 18 thereby ensuring valve seal 20 remains closed while post face 74 forms the seal against the recess 24 portion of valve seal 20. Since in the intermediate position valve face 16 is sealed to probe seal face 70 around and adjacent valve port 14, and tapered recess 24 of valve seal 20 is sealed to probe post face 74 within valve port 14, as seen in FIG. 2, none of the external surfaces of valve 10 and probe 50 will come in contact with any fluid which will be conveyed through engaged probe 50 and valve 10. Further urging of one or both of valve 10 and probe 50 in their respective forward directions, at forces higher than the combined urging means of valve 10 and probe 50, results in probe post 56 displacing valve seating portion 22 rearwardly away from valve seat 18, and simultaneously, probe seating portion 62 being displaced from probe post seat 58 by valve face 16, thus allowing fluid to flow through the engaged valve 10 and probe 50 as best shown in FIG. 3. Valve 10 and probe 50 are held in their engaged position by virtue of an annular lip 42 on external hub 40 of valve 10, snapping into place over a mating annular lip 82 on external hub 80 of probe 50. A firm pull of either or both of valve 10 and probe 50 in a rearward direction away from one another, will cause lips 42 and 82 to disengage.

Upon movement of one of probe 50 and valve 10 in a rearward direction away from the other back toward the intermediate position of FIG. 2, valve seating portion 22 is again urged into sealing engagement with valve seat 18 due to the resilient nature of valve seal 20, thereby closing valve 10. Simultaneously probe seating portion 62 is again urged into sealing engagement with probe post seat 58 due to the resilient nature of probe seal 60, thereby closing probe 50. Since in the intermediate position valve face 16 is sealed to probe seal face 70 around and adjacent valve port 14, and tapered recess 24 of valve seal 20 is sealed to probe post face 74 within valve port 14, as seen in FIG. 2, none of the external surfaces of valve 10 and probe 50 are in contact with any fluid which was conveyed through engaged probe 50 and valve 10. Thus when probe 50 and valve 10 are separated there is no loss of fluids.

Since valve 10 and probe 50 utilize tapered seating portions of the type described, and tapered seats, there are no sliding seals which are difficult to manufacture as they generally require close tolerances. Additionally, the tapered seals and tapered seats form flow paths with substantial cross section with only small displacements of the probe 50 relative to the valve 10, and these flow paths are substantially axial in nature, thus flow losses are minimized. Further, as already described, surfaces of valve 10 and probe 50 which are normally exposed to the external environment (that is, the atmosphere) when valve 10 and probe 50 are disengaged, remain out of contact with fluid being conveyed through valve 10 and probe 50 after engagement. Thus, no liquid is exposed to the atmosphere.

Figure 4:
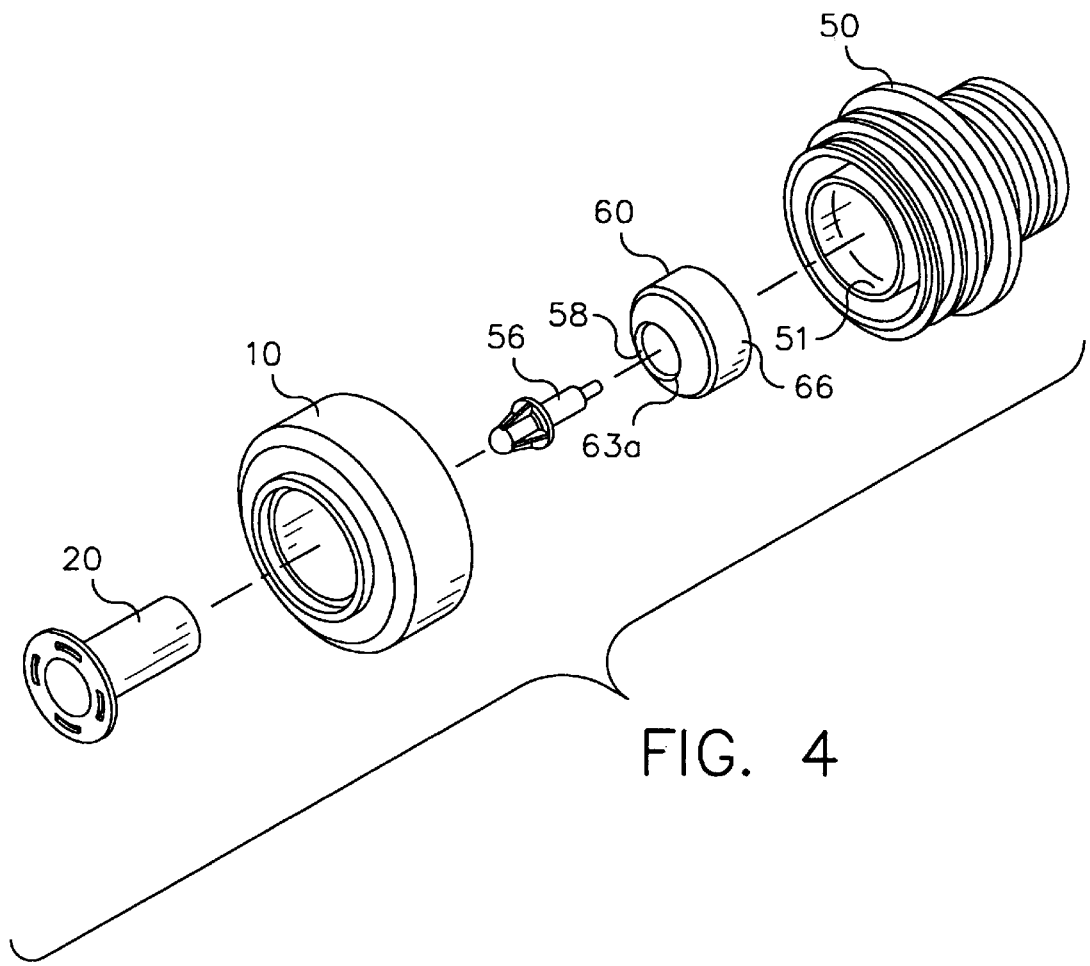
FIG. 4 is a perspective exploded view of a valve and probe assemblage of FIG. 1.
Figure 5:
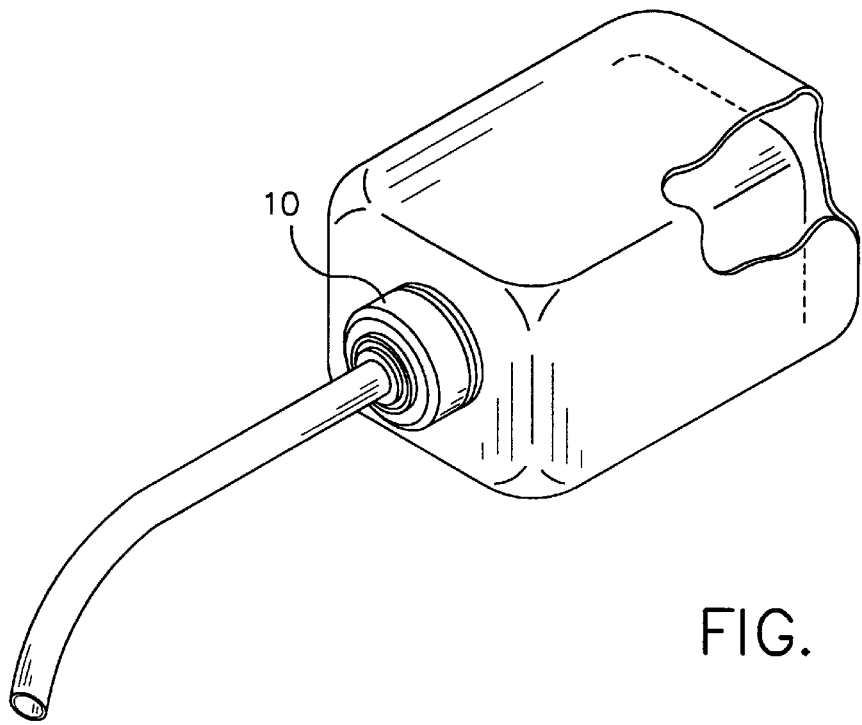
FIG. 5 is a perspective view showing a liquid carrying container of the present invention, including a valve or probe of the present invention.

Referring to FIG. 4, there is shown a container 100 carrying a fluid which is to be conveyed from the container to another location. Container 100 may be of a transparent or translucent collapsible plastic, and is factory filled with a fluid so as to be air tight, the only access being through a probe 50 which communicates with the interior of the container. Since container 100 may be disposable it may be best that probe 50 is used on the container rather than valve 10, since probe 50 may be slightly cheaper to construct. However, this arrangement can very readily be the reverse, with valve 10 being connected to container 100. To remove fluid from container 100, a mating probe or valve is engaged with the other one on the container, in the manner already described, and fluid is then siphoned, pumped, or removed through the engaged valve and probe assembly by other means. At any time, particularly when container 100 is empty, the valve and probe 50 can be disengaged. In this manner, particularly fluids which should not be exposed to air, can be conveyed to another location. For example, photographic processing liquids for developing and fixing silver halide photographic elements, can be conveyed into a photographic developing machine. Such liquids can include a silver halide black and white developer or color developer, as well as fixer, stop bath, silver halide oxidizer, and other silver halide photographic media processing liquids or solutions.

The invention has been described with reference to preferred embodiments. However, it will be appreciated that variations and modifications can be effected by a person of ordinary skill in the art without departing from the scope of the invention.

PARTS LIST

10 Valve
11 Rear Opening
12 Valve Body
13 Valve Body Forward End
14 Valve Port
16 Valve Face
18 Valve Seat
20 Valve Seal
21 Valve Seal Forward End
21a Margin
22 Seating Portion
24 Recess
40 External Hub
42, 82 Lips
50 Probe
51a Front Opening
51 Probe Body
52 Probe Base
54 Probe Post Stem
56 Probe Post
58 Probe Post Seat
60 Probe Seal
61 Forward End
62 Seating Portion
63 Probe Port
63a Forward Margin
64 Probe Sleeve
66 Probe Seal Skirt
68 Probe Passages
70 Probe Seal Face
74 Probe Post Face
74a Margin
80 External Hub
100 Container
110 Hose

What is claimed is:

1. A probe comprising:
   a probe body;
   a probe post positioned in the probe body and having a forward end with a forwardly tapering front face and a rearwardly tapering probe post seat;
   a probe seal within the probe body, the probe seal having a forward end with a rearwardly tapering probe seal opening, the forward end of the probe seal having a seal face, the forward end being movable rearwardly from a closed position sealingly mating against the probe post seat to close the probe seal opening to an open position in which the probe seal face is spaced from the probe post seat to allow fluid to pass through the probe seal opening and hence through the probe; and
   first resilient means for urging the fonvard end of the probe seal into the closed position.

2. A probe according to claim 1 wherein a region of largest lateral extent of the forward end of the probe post is defined by a margin between the forwardly tapering front face and the rearwardly tapering probe post seat, and wherein that margin is flush with a forward surface of the forward end of the probe seal when the probe seal is in the closed position.

3. A fluid container comprising a container with a probe according to claim 1.

4. A fluid container comprising a liquid container with a probe according to claim 1, wherein the container contains a silver halide photographic media processing liquid.

* * * * *